United States Patent
Kerr

[11] Patent Number: 5,788,256
[45] Date of Patent: Aug. 4, 1998

[54] MODULAR BOAT RACK

[76] Inventor: Steven Thomas Kerr, 4810 Quarry Rd., New Albany, Ind. 47150

[21] Appl. No.: 617,364

[22] Filed: Mar. 18, 1996

[51] Int. Cl.⁶ .................................................. B60P 3/10
[52] U.S. Cl. ...................... 280/414.1; 414/495; 114/344
[58] Field of Search .......................... 280/414.1, 414.2, 280/47.34, 79.11, 79.3, 442; 414/529–536, 495; 114/344

[56] References Cited

U.S. PATENT DOCUMENTS

| 3,337,171 | 8/1967 | Canning | 280/414.1 |
| 4,801,152 | 1/1989 | Elliott et al. | 280/414.1 |
| 5,096,216 | 3/1992 | McCalla | 280/414.1 |

FOREIGN PATENT DOCUMENTS 1403803  5/1965  France .................. 280/442

Primary Examiner—Karen D. Merritt
Assistant Examiner—Raymond B. Johnson

[57] ABSTRACT

A modular boat rack consisting of aluminum castings attached to an aluminum tubular beam of length dependant upon boat length and having nylon webbing of same width as casting pinned at and suspended from the top corners of said castings. The webbing is adjustable of length and tension to suit different hull or deck design configurations. Legs are attached to the ends of each case.

4 Claims, 7 Drawing Sheets

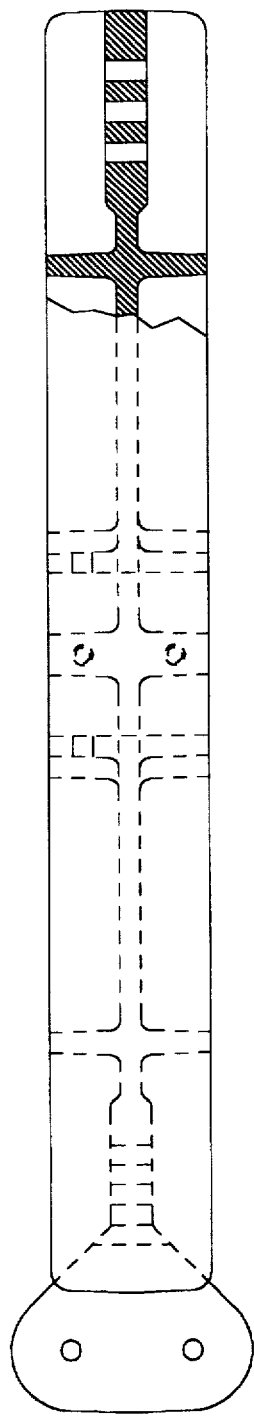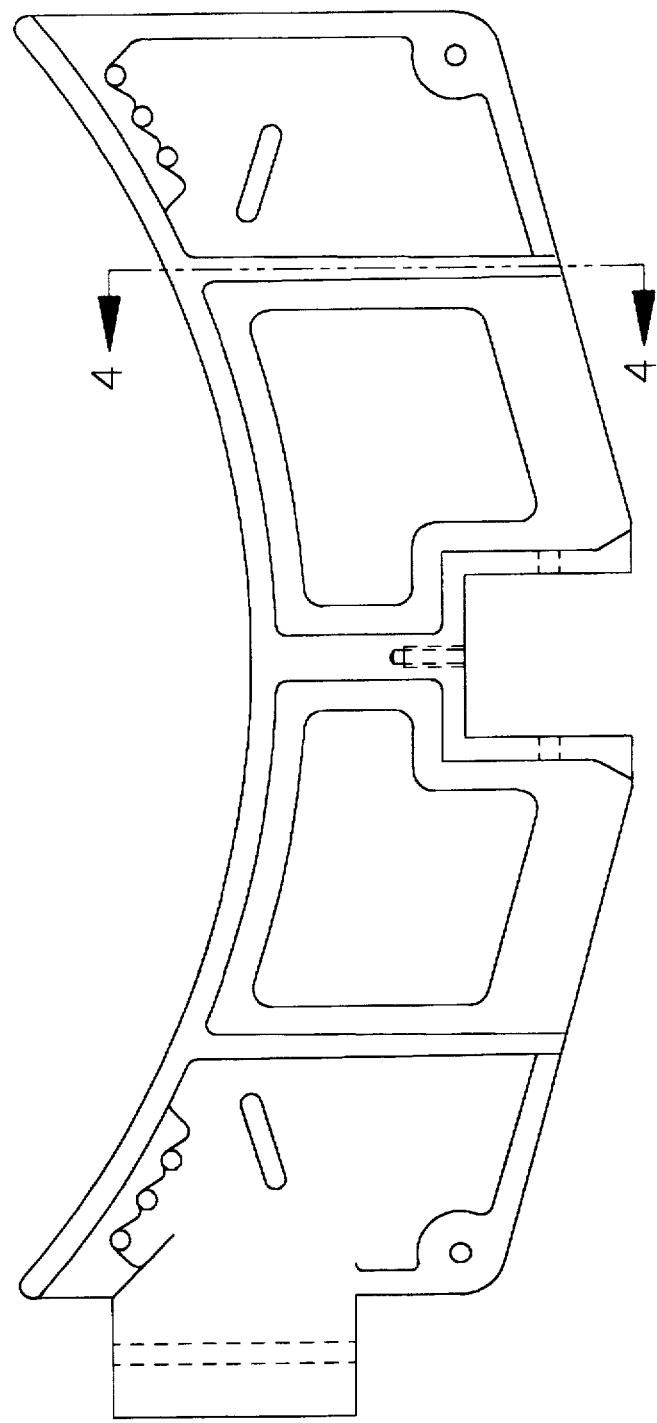
FIG. 2
FIG. 1

U.S. Patent     Aug. 4, 1998     Sheet 7 of 7     5,788,256
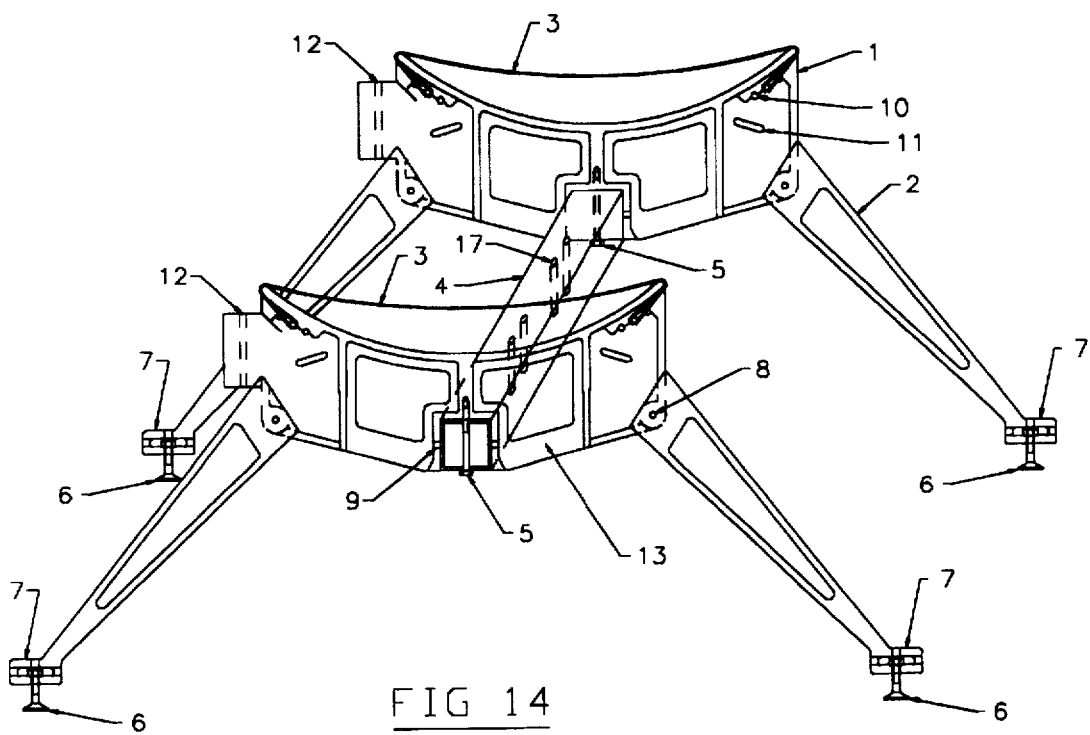
FIG 14
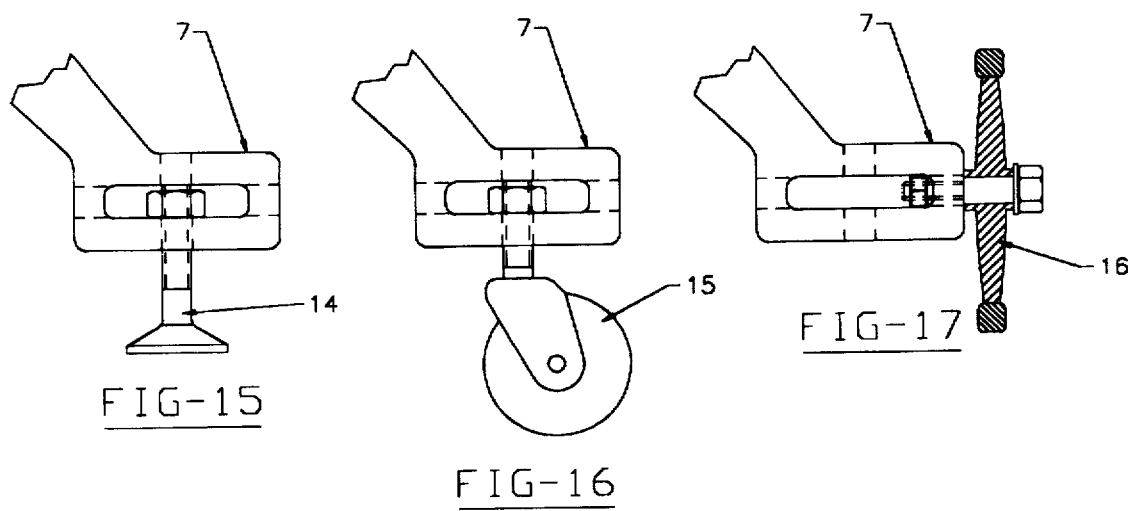
FIG-15
FIG-16
FIG-17

MODULAR BOAT RACK

BACKGROUND OF THE INVENTION

1. Field of the Invention

This invention relates to a class of boat handling equipment which includes boat trailers, racks, sling, and cradles in which boats are transported in an upright position. Of the patents searched in this field none make mention of narrow beam boats such as canoes, kayaks, or rowing shells which are usually double ender in style. Of these patents many can be disassembled for storage of the trailer itself and none are modular for other uses such as storage of boat or work platform for repair and maintenance of a boat.

2. Description of the Prior Art

Various trailers and other devices for hoisting and transporting boats are known in the art. All patents searched in this art are in trailer form to be towed by a motor vehicle and have through axles or stub axles to support the weight of the boat or load. U.S. Pat. No. 4,029,227 dated Jun. 14, 1977 to Jacques Martinez, describes a "substantially arch-shaped structure which is moved into position above the load". Mention is also made of various transverse suspension straps and transverse frame elements in this and other patents cited in this searched. All drawings of references cited illustrate boats in an upright position and either suspended from above or supported from below by transverse members.

SUMMARY OF THE INVENTION

A modular rack intended for nesting and securing a boat in either the upright or inverted position and used for storage, transport, or as a work platform for said boat. Convertible from transport to storage mode by bolting or pinning a pair of vertical post mounting brackets for mounting to standard size lumber or square tubing of metal or other material.

With four cast aluminum legs attached by bolts or quick detachable pins this invention becomes a work platform which can be used to move a boat on hard or soft surfaces as well.

Yet another embodiment would have two main (sling) castings bolted to a tubular beam which is in turn bolted or u-bolted (not illustrated) to the cross members of most common cartop racks for road transport of a boat.

BRIEF DESCRIPTION OF THE DRAWINGS

The invention will be better understood by reference to the accompanying drawings, wherein:

FIG. 1 is a side elevation view of a main (sling) casting in accordance with this invention;

FIG. 2 is a top view, partially in section, of the casting illustrated in FIG. 1

FIG. 14 is a pictorial view illustrating assembly of main (sling) castings to tubular beam and leg castings to main castings;

FIG. 15 illustrates an adjustable foot fastened to lower end of cast aluminum leg;

FIG. 16 illustrates a swivel caster fastened to lower end of cast aluminum leg;

FIG. 17 illustrates a wheel fastened to lower end of cast aluminum leg;

DETAILED DESCRIPTION OF INVENTION

My invention is known as the Shellsling™.

All references are taken from FIG. 14 unless otherwise stated.

The Shellsling™ consist of two main castings, #1 and #13, sand cast in 319 Alloy Aluminum. These main castings are connected by a square tubular member of various length and material #4, and thru bolted with four ¼ inch by 2½ inch U.N.C. hex head bolts #5. Any narrow beam boat may nest upright or inverted on the nylon web sling constructed of five pieces of nylon web of various widths, and illustrated as #3. This sling is adjustable for hull or deck shape using any two of six thru holes shown at #10. This nylon web #3, is attached at it's ends with ¼ inch by 2½ inch hex head bolts and ¼-20 U.N.C. hex nuts or ¼ inch by 2½ inch quick detachable pins. The boat may be secured to the assembled invention with 1 inch nylon strap run over the boat and thru slots, #11 before buckling. Four legs, #2, can be attached at mounting position #8 with ¼ inch by 2 inch hex head bolts and ¼ inch hex nuts or ¼ inch by 2 inch quick detachable pins. Number 9 is a horizontal thru hole for alternate mounting of the main castings to the tubular member, and may be used for quick adjustment and attachment of castings at various sling to sling distances along the length of the tublar member. This would be accomplished by bolting or pinning the casting to the tubular member through horizontally drilled holes (not illustrated) in the tubular member. Four leveling feet, #6, attached to vertical mounting hole at #7 converts the invention into a stable workplatform for boat maintenance and repair. Four casters, #15, FIG. 16 can be attached to vertical mounting holes at #7 for movement in any direction on a hard surface. A wheel, #16, FIG. 17 can be attached to horizontal mounting hole at #7 for movement of a boat on hard and/or soft surfaces.

The leveling foot, #6, FIG. 15 is the same as #6, FIG. 14 and is enlarged for clarity.

Figure 6:
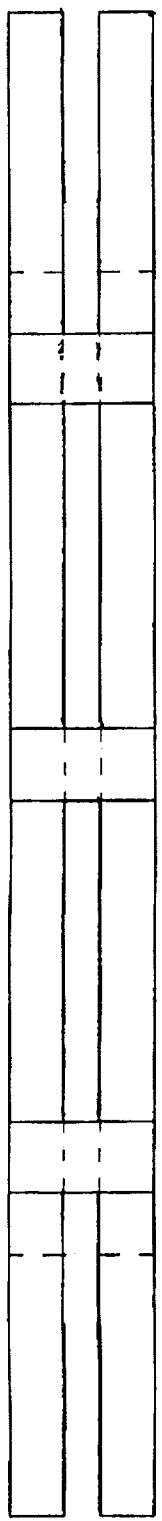
FIG. 6 is a top view of FIG. 5.
Figure 5:
FIG. 5 is a side elevation of nylon web sling.
Figure 4:
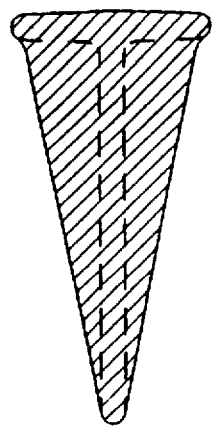
FIG. 4 is an end sectional view of FIG. 1 taken along section line 4—4.
Figure 3:
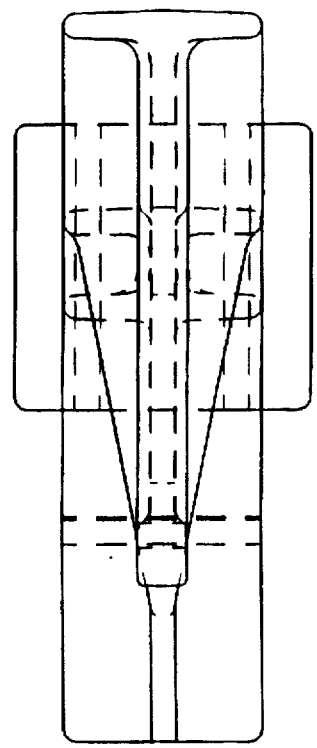
FIG. 3 is an end elevation view of FIG. 1.
Figure 8:
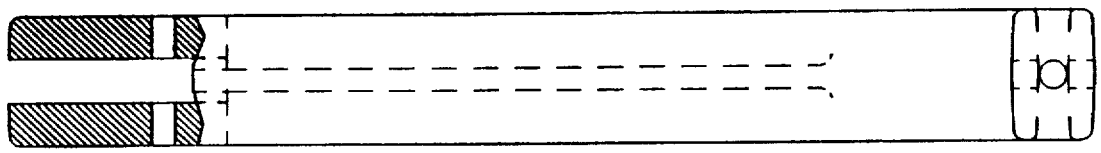
FIG. 8 is a front elevation view of FIG. 7 partially in section for the illustration of mounting pocket of FIG. 7 and also illustrating mounting holes for FIG. 15, FIG. 16, and FIG. 17.
Figure 7:
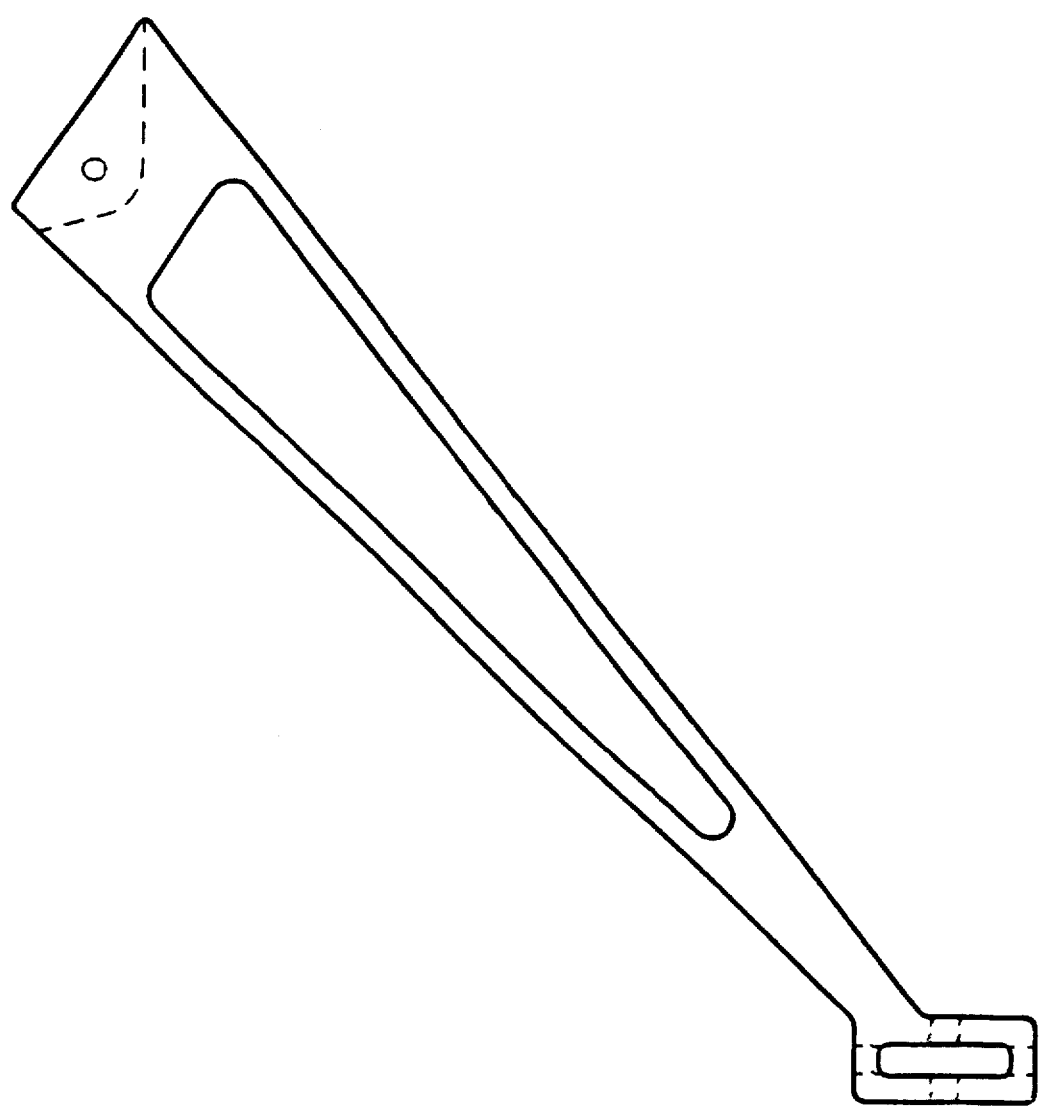
FIG. 7 is a side elevation of aluminum leg casting illustrating mounting pocket and mounting hole for attachment to main (sling) casting.
Figure 9:
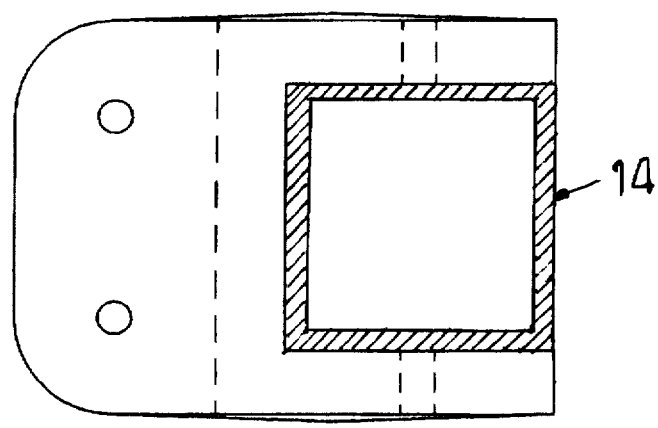
FIG. 9 is a top view of a vertical post mounting bracket for attachment of FIG. 1 to a vertical post of metal or other material.
Figure 10:
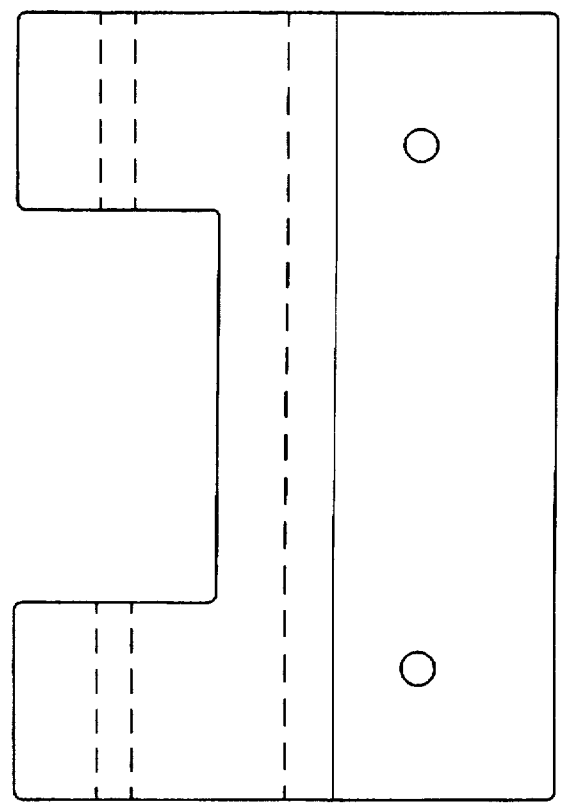
FIG. 10 is a side elevation view of FIG. 9.
Figure 11:
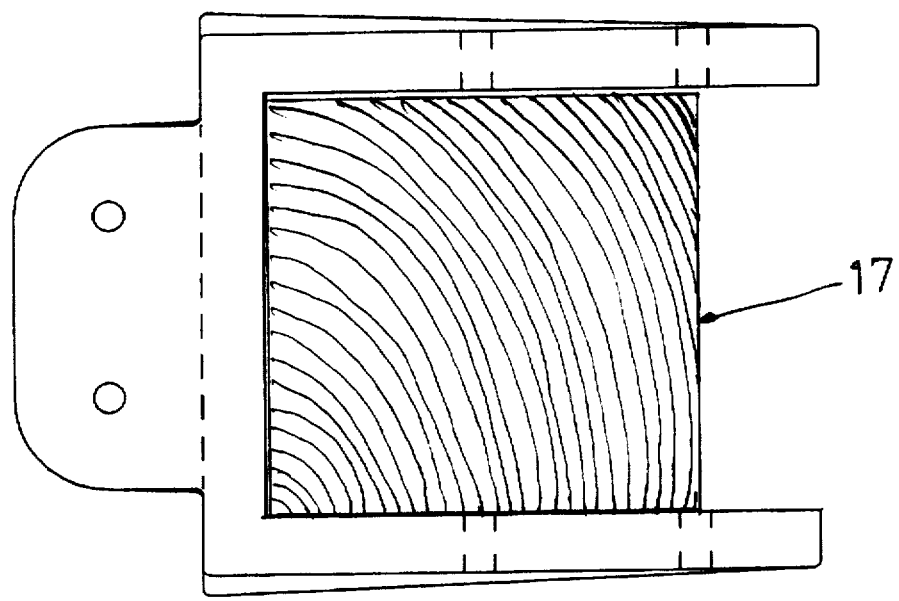
FIG. 11 is a top view of a vertical post mounting bracket for attachment of FIG. 1 to a vertical post of wood (standard lumber) or other material.
Figure 12:
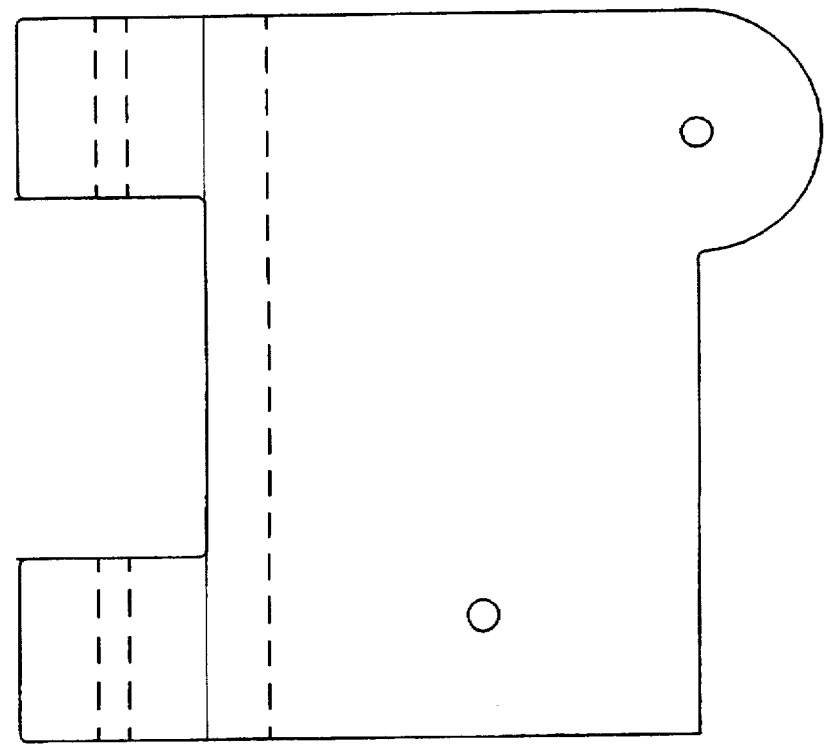
FIG. 12 is a side elevation view of FIG. 11.
Figure 13:
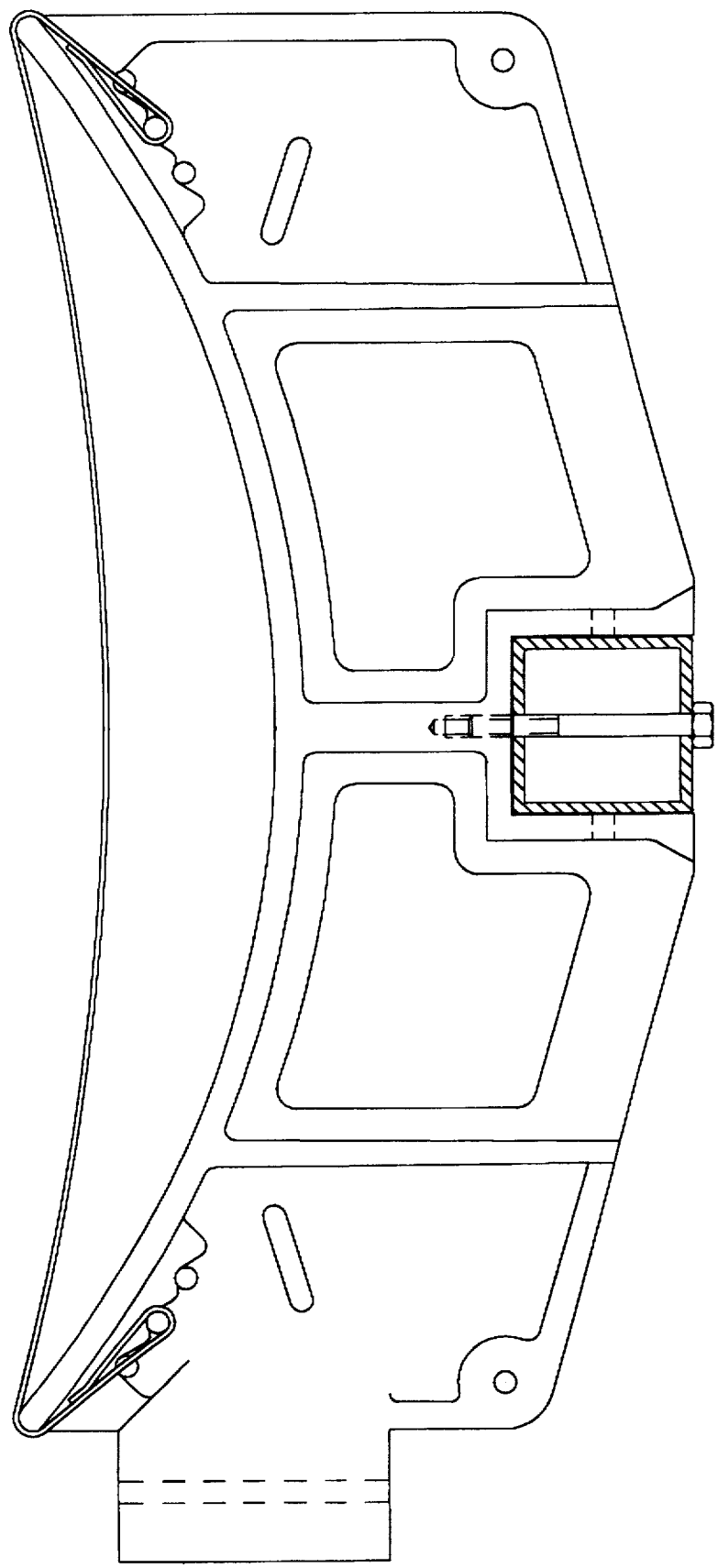
FIG. 13 is a side elevation partial assembly drawing of FIG. 1 detailing attachment of nylon web sling and tubular beam shown in its end view.

Another arrangement of the shellsling would be attachment of two main castings #1 and #13 to two vertical post mountings brackets FIG. 9 at #12. When pinned or bolted to a vertical post of square tubing at#14 FIG. 9, two shellslings serve as tierable storage for a boat indoors, outdoors, or on a trailer. Another configuration uses vertical post mounting bracket illustrated in FIG. 11 and FIG. 12 to adapt two main castings to vertical post of standard size lumber #17 or other material for storage of a boat indoors or outdoors.

Advantages of the Invention

1. Versatility (a.) Two castings of the Shellsing™ when used with one piece of 2"sq. tubing of various length (depending on boat length) can be used to transport a boat (rowing shell, canoe, kayak. etc.) when affixed to a common cartop rack.

(b.) With two 3.5"sq. post mounting brackets attached to two Shellsling™ castings, these castings can be mounted to 4" by 4" vertical post (lumber). This allows for the boat to be stored outdoors or indoors.

(c.) With two 2"sq. post mounting brackets attached to two Shellsling™ castings these castings can be mounted to 2"sq. vertical post of aluminum or steel box tubing.

This allows for the storage of numerous barss(with the use of more castings) indoors or outdoors on the same pair of vertical post.

(d.) With four legs quick detachable pinned or bolted to two Shellsling™ castings, these castings can be used as a work platform for boat repair or maintenance.

(e.) With four 1 ⅝" swivel casters attached to four legs the platform can be moved in any direction on a hard surface for transport or storage.

(f.) With two 4" wheels attached to two legs a boat can be lifted wheel barrow style and moved longitudinally or steered in any direction.

(g.) With two 2" post mounting brackets attached to two Shellsling™ the castings can be attached to 2" sq. vertical post of a trailer for interstate transport of of a boat.

2. Adjustability Using any two of the six thru holes in the Shellsling™ casting the sling (2" wide nylon web) can be adjusted to accommodate many brands of boats of different hull and/or deck shapes.

3. Protection The 2" nylon webbing (sling) which the boat nests in covers all hard top surfaces of the Shellsling™. This provides protection from dents and scratches of your boat.

4. Security Using the ¼"×1¼ thru slots in the Shellsling™ castings any narrow beam boat can be secured with two 1" wide straps of various lengths.

I claim:

1. A modular boat rack comprising: a pair of horizontally spaced apart elongated castings, each casting defining a first and second end, an upper surface configured to support the hull of a boat and a lower surface with a centrally mounted recess therein;

a tubular member extending between the spaced apart castings, means for mounting said tubular members in a respective recess of the castings to maintain said castings a selected horizontally spaced apart distance;

boat support web slings, each of said slings having first and second sling ends, means for adjustably attaching the respective sling ends to the castings at a location adjacent the ends of the respective casting such that a portion of the attached web sling is positioned above said upper surface;

casting support legs, means for attaching a support leg to each of said first and second end of said castings at a location adjacent said lower surface; and a laterally extending bracket formed on each of said castings at said first end of said casting at a location intermediate said upper and lower surfaces, said brackets including means for connecting said first end of said casting to a member for supporting said castings with a boat thereon in either a storage or travel mode.

2. A modular boat rack as recited in claim 1, wherein said support legs includes a leveling feet.

3. A modular boat rack as recited in claim 1 wherein said support legs includes a caster at an end thereof.

4. A modular boat rack as recited in claim 1 wherein said support legs includes a wheel at an end thereof.

* * * * *